United States Patent [19]

Forkel et al.

[11] Patent Number: 4,597,607

[45] Date of Patent: Jul. 1, 1986

[54] ARRANGEMENT FOR LOCKING AN ENTRAINMENT MEMBER FOR A SAFETY BELT

[75] Inventors: Michael Forkel, Coburg; Claus Dallwig, Rödental; Hans-Joachim Volk, Ebersdorf, all of Fed. Rep. of Germany

[73] Assignee: Brose Fahrzeugteile GmbH & Co. KG, Fed. Rep. of Germany

[21] Appl. No.: 649,182

[22] Filed: Sep. 10, 1984

[30] Foreign Application Priority Data

Sep. 22, 1983 [DE] Fed. Rep. of Germany ..... 33334354

[51] Int. Cl.4 .............................................. B60R 21/00
[52] U.S. Cl. ......................................... 297/468; 24/635
[58] Field of Search ......................... 24/635, 651, 483; 297/468, 479

[56] References Cited

U.S. PATENT DOCUMENTS

| 4,245,376 | 1/1981 | Lassche | 297/486 |
| 4,480,854 | 11/1984 | Doty | 297/476 |
| 4,491,344 | 1/1985 | Fohl | 297/483 |

FOREIGN PATENT DOCUMENTS

| 0020903 | 1/1981 | European Pat. Off. | 635/ |
| 0740565 | 6/1980 | U.S.S.R. | 297/468 |

Primary Examiner—James T. McCall
Attorney, Agent, or Firm—Craig & Burns

[57] ABSTRACT

An arrangement for locking an entrainment member for a safety belt at a cassette, in which the entrainment member is adjustable along a guide profile by a pressure-resistant cable; an adjustable locking member engaging the entrainment member is thereby supported in the cassette, which is constructed tubularly-shaped and in one piece; an insert member is detachably secured in the cassette, which consists in particular of plastic material—preferably of a polyacetyl—or of a die-cast metal—preferably of aluminum—and which form-lockingly surrounds the free end of the guide profile.

14 Claims, 7 Drawing Figures

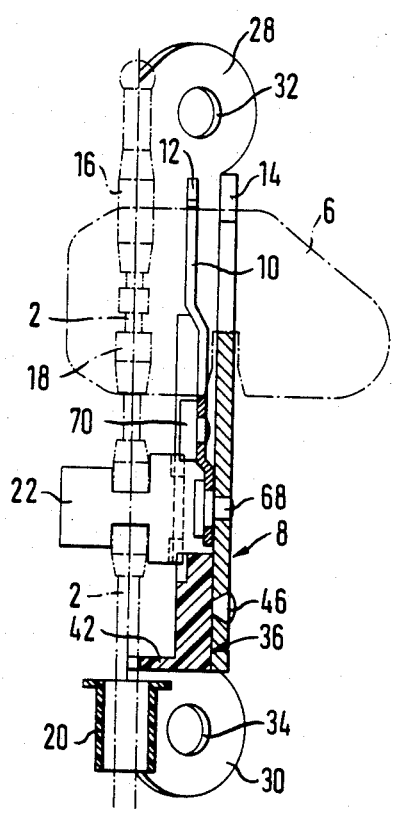
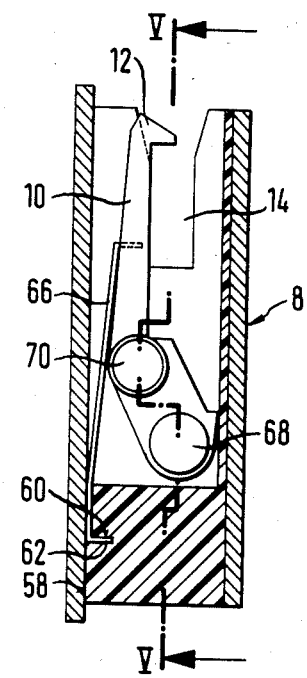
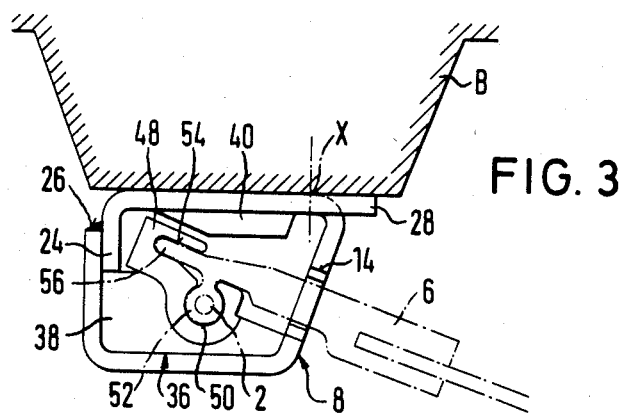

ARRANGEMENT FOR LOCKING AN ENTRAINMENT MEMBER FOR A SAFETY BELT

The present invention relates to an arrangement for locking an entrainment member for a safety belt at a cassette, in which the entrainment member is adjustable along a guide profile by a pressure-resistant cable, and in which an adjustable locking member, that engages the entrainment member, is supported in the cassette.

In an arrangement of this type, as disclosed in the German Offenlegungsschrift No. 29 42 207, the "cassette" consists of a U-profile which is open at both end faces and along one side. The parts located in this "cassette" are relatively unprotected.

It is also known to form the "cassette" of two half shells which are welded together and in which lugs are bent-out for positioning the guide profile. Tolerance problems result from the welding together of the half shells and the bending-out of the lugs.

It is an object of the present invention to provide an installation of the type described above which can be assembled without difficulty of few individual parts and without the occurrence of considerable tolerance problems.

The underlying problems are solved according to the present invention in that the cassette is constructed tubularly-shaped in one piece and an insert member, in particular of plastic material—preferably of polyacetyl—or of a die-cast metal—preferably of aluminum—is detachably secured in the cassette, whereby the insert member form-lockingly surrounds the free end of the guide profile.

The one-piece tubularly-shaped construction of the cassette can be realized without difficulty from a manufacturing point of view. The plastic block can be injection molded to accurate dimensions without difficulties and, together with the unitary tubularly-shaped construction of the cassette, brings about that practically no tolerance problems occur.

According to another feature of the present invention, a form-locking positioning and securing of the guide profile can be achieved if the insert member surrounds the guide profile and includes a bottom, against which abuts the free end face of the guide profile.

A solid cassette which can be manufactured in a particularly simple manner is obtained according to the present invention if the cassette consists of tubularly-shaped bent and welded together steel plating.

In order to be able to support also a hose that surrounds the cable, a construction is preferred according to the present invention in which the insert member is provided with an aperture for the accommodation and support of a hose surrounding the cable.

According to still another feature of the present invention, a simple mounting for a leaf spring, coordinated to the locking member and requiring no separate stop means, is obtained if the insert member is provided in a side surface nearly abutting at the cassette, with a slot for receiving a bent end of a leaf spring that extends to the backside of a latching hook pivotally supported in the cassette and serving as locking member.

A form-locking and simple detachable mounting of the plastic block in the cassette can be realized according to the present invention if the insert member is secured in the cassette by means of a screw extending through the cassette from the outside.

In order to enable a narrow construction of the cassette, the present invention prefers a construction, according to which the cassette is threadably secured at a B-column in a location disposed in front of the guide profile, as viewed in the driving direction.

In order to integrate a limit switch to be actuated by the entrainment member, the present invention provides a construction, pursuant to which the limit switch to be actuated by the entrainment member is arranged in the bottom of the insert member, whereby a springily-supported intermediate switch part is arranged between the end position of the entrainment member and the limit switch.

These and other objects, features and advantages of the present invention will become more apparent from the following description when taken in connection with the accompanying drawing which shows, for purposes of illustration only, two embodiments in accordance with the present invention, and wherein:

FIG. 3 illustrates a view corresponding to FIG. 2, with inserted guide profile;

FIG. 4 is a cross-sectional view taken along line IV—IV of FIG. 2;

FIG. 5 is a cross-sectional view taken along line V—V of FIG. 4;

Figure 1:
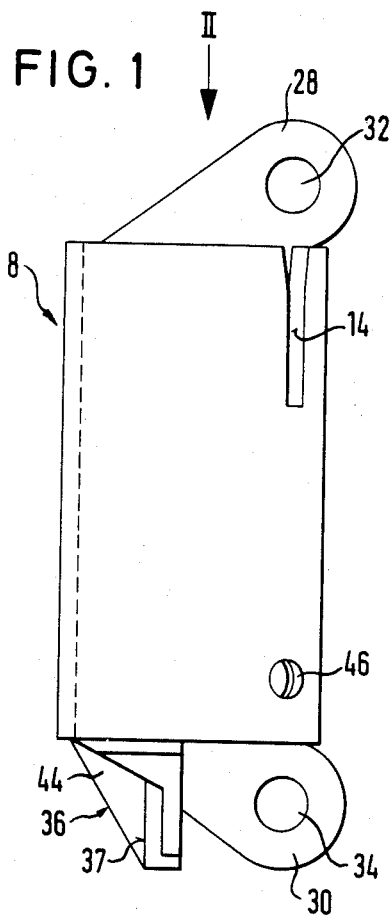
FIG. 1 is a side elevational view of a first embodiment of an arrangement for locking an entrainment member for a safety belt in accordance with the present invention.
Figure 2:
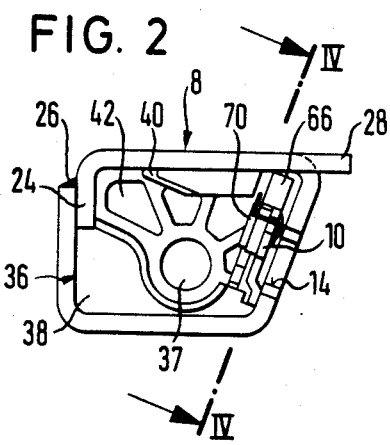
FIG. 2 is a plan view on the installation according to FIG. 1, taken in the direction of arrow II with a removed guide profile.

Referring now to the drawing wherein like reference numerals are used throughout the various views to designate like parts, the installation serves for locking an entrainment member 6 (FIGS. 2 and 3) for a safety belt (not shown) at a cassette generally designated by reference numeral 8, in which the entrainment member 6 is adapted to be fixed along a guide profile 48 by a pressure-resistant cable 2 (FIGS. 3 and 5), and in which an adjustable locking member in the form of a latching hook 10 (FIGS. 4 and 5) and engaging the entrainment member 6, is pivotally supported in the cassette 8. The hook element 12 of the latching hook 10 is able to surround the entrainment member 6, after the entrainment member 6 has entered a slot 14 (Figs. 1, 2, 4 and 5) extending from the end face of the cassette 8. The entrainment member 6 is seated on the cable 2 axially displaceable by a limited amount between two abutment members 16 and 18 on a hose 20 (FIG. 5) surrounding the cable 2. An unlocking member 22 is seated axially nondisplaceably on the cable 2 in front of the entrainment member 6, as viewed in the insertion direction of the entrainment member 6 into the cassette 8. The purpose of the axial displaceability of the entrainment member 6 on the cable 2 of the unlocking member 22 and of its fastening can be readily ascertained from the German Offenlegungsschrift No. 29 42 207.

The cassette 8 is constructed tubularly-shaped in one piece, namely of sheet-metal steel plating bent to provide an overlap 24 (FIGS. 2 and 3) and welded together at the outer freely-exposed overlapping edge 26. Lugs 28 and 30, having fastening apertures 32 and 34 which are formed by the steel plating, project beyond the free ends of the cassette 8. Owing to the fact that these fastening openings 32 and 34 are located at places X (FIG. 3) disposed in front of the guide profile 48, as viewed in the driving direction, which places can be seen on a B-column, the cassette 8 does not project laterally beyond the B-column B (FIG. 3).

A synthetic plastic block 36 (FIGS. 3 and 5) is inserted into the cassette 8 with a sliding seat. The parts 38 and 40 of the plastic block 36 extend over the entire length of the cassette 8. Another part 42 forms a bottom and a part 44 (FIG. 1) projects out of the cassette 8 and forms an open half shell for the support for the hose 20.

The plastic block 36 is fixed in the cassette 8 by a screw 46 (FIG. 5) extending through the cassette 8.

The free end of a guide profile 48 (FIG. 3) is inserted into the plastic block 36, which extends to the bottom 42 of the plastic block 36. In addition to the bottom 42, also the areas 38 and 40 of the plastic block 36, which extend over the entire length of the cassette 8, take care for the form-locking seating. The guide profile 48 contains a circular channel 50 (FIG. 3) for the cable 2 and for a ring 52 at the entrainment member 6 surrounding the cable 2 and a longitudinal groove 54 (FIG. 3) for accommodating a guide lug 56 at the entrainment member 6, which prevents the entrainment member 6 from tilting about the cable 2.

The plastic block 36 is provided, in its side surface 58 nearly abutting at the cassette 8, with a slot 60 (FIG. 4) for receiving a bent-off end 62 of a leaf spring 66 which presses against the backside of the latching hook 10. The latching hook 10 is pivotal about a bearing rivet 68 mounted in an adjoining sidewall of the cassette 8. The latching hook 10 is provided with a hook element 12 at its free end, while an unlocking element 70, which has the function described in the German Offenlegungsschrift No. 29 42 207, is attached laterally at the latching hook 10 between the hook element 12 and the bearing rivet 68.

Figure 6:
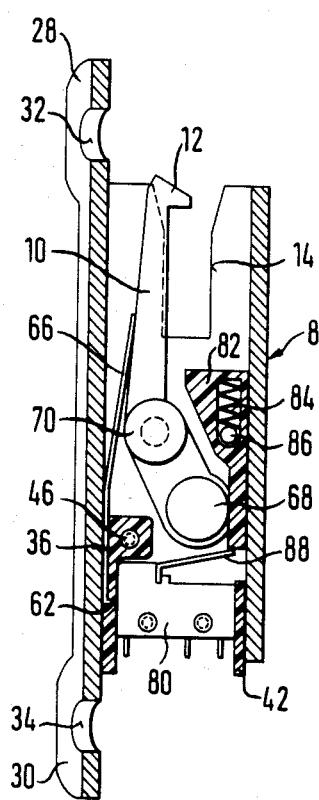
FIG. 6 is a cross-sectional view through a second embodiment in accordance with the present invention similar to FIG. 4, but rotated through 90°.
Figure 7:
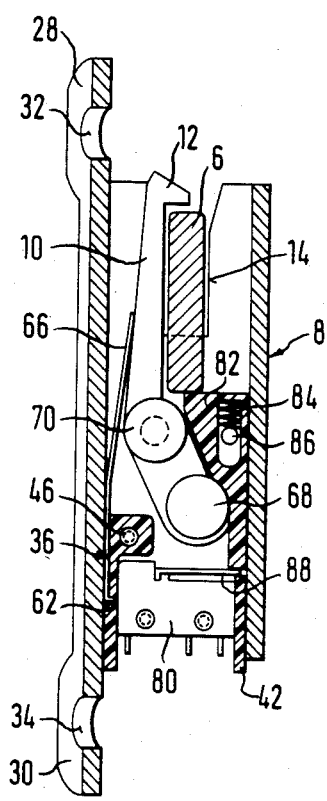
FIG. 7 illustrates an arrangement according to FIG. 6 in another operating condition.

The embodiment of FIGS. 6 and 7 differs from the described embodiment only in that a limit switch 80, to be actuated by the entrainment member 6, is arranged at the bottom 42 of the insert member 36. In this—however, not necessarily so—an intermediate switching member 82, which is supported by a spring 84 at a pin 86 fixed in the cassette 8, is arranged between the end position of the entrainment member 6 and the limit switch 80. The intermediate switching member 82 is able to act on the switching lug 88 of the limit switch 80.

While we have shown and described only two embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A cassette for locking an entrainment member of a safety belt of a passenger car, comprising:
a guide profile comprised of a pressure-resistant cable for adjustably guiding said entrainment member along a limited path, a releasable locking element including spring means disposed in said cassette for locking said entrainment member, said cassette being formed in one piece in the shape of a tube and including insertion means for providing at least one confinement surface therein, said insertion means having a bottom surface, a free front surface, and a recess for receiving and supporting a hose enclosing said cable, and wherein said insertion means, on a lateral surface thereof that substantially rests against said cassette, includes means for supporting said spring means of said locking element.

2. The invention according to claim 1, wherein the cassette comprises a steel plate that is bent in a tube-shaped manner and welded together.

3. The invention according to claim 1, wherein said insertion means is fastened in said cassette by means of a screw penetrating the cassette.

4. The invention according to claim 2, wherein said insertion means is fastened in said cassette by means of a screw penetrating the cassette.

5. The invention according to claim 1, wherein the cassette includes fastening means for attaching said cassette to a support means at a location forward of said guide profile.

6. The invention according to claim 2, wherein the cassette includes fastening means for attaching said cassette to a support means at a location forward of said guide profile.

7. The invention according to claim 3, wherein the cassette includes fastening means for attaching said cassette to a support means at a location forward of said guide profile.

8. The invention according to claim 1, further including a limit switch disposed at the bottom of said insertion means and adapted to be actuated by said entrainment member.

9. The invention according to claim 2, further including a limit switch disposed at the bottom of said insertion means and adapted to be actuated by said entrainment member.

10. The invention according to claim 3, further including a limit switch disposed at the bottom of said insertion means and adapted to be actuated by said entrainment member.

11. The invention according to claim 4, further including a limit switch disposed at the bottom of said insertion means and adapted to be actuated by said entrainment member.

12. The invention according to claim 8, further including an elastically supported intermediate switching piece arranged between an end position of said entrainment member and said limit switch.

13. The invention according to claim 1, wherein said insertion means is formed as a diecast part.

14. The invention according to claim 1, wherein said insertion means is formed as an injection-molded part.

* * * * *